United States Patent [19]
Kobylarz et al.

[11] 4,047,229
[45] Sept. 6, 1977

[54] VELOCITY CONTROLLED MANUAL MOVEMENT CREDIT CARD READER

[75] Inventors: Lawrence P. Kobylarz, Howell; Ronald H. Mack, Plymouth, both of Mich.

[73] Assignee: Burroughs Corporation, Detroit, Mich.

[21] Appl. No.: 633,129

[22] Filed: Nov. 18, 1975

[51] Int. Cl.² .............................................. G11B 19/24
[52] U.S. Cl. .............................................. 360/2; 360/4
[58] Field of Search ................. 360/2, 4; 235/61.11 A, 235/61.11 B, 61.11 D, 61.11 E, 61.7 B, 61.12 M; 340/147 A; 179/90 CS

[56] References Cited

U.S. PATENT DOCUMENTS

| 3,419,710 | 12/1968 | Mathews | 235/61.11 D |
| 3,571,799 | 3/1971 | Coker, Jr. | 235/61.11 D |
| 3,708,790 | 1/1973 | Nourigat | 235/61.12 M |
| 3,925,814 | 12/1975 | Chernowitz | 360/2 |
| 3,953,887 | 4/1976 | Kobylarz | 360/2 |

Primary Examiner—Jay P. Lucas
Attorney, Agent, or Firm—Larry Michael Jarvis; Edward J. Feeney, Jr.; Kevin R. Peterson

[57] ABSTRACT

A slidable carriage adapted to receive and carry an information bearing credit card along a linear path in traversing registry with respect to an informational read head. A spring and dashpot cooperate with the carriage during movement thereof for limiting the velocity of the carriage to assure proper credit card reading.

5 Claims, 5 Drawing Figures

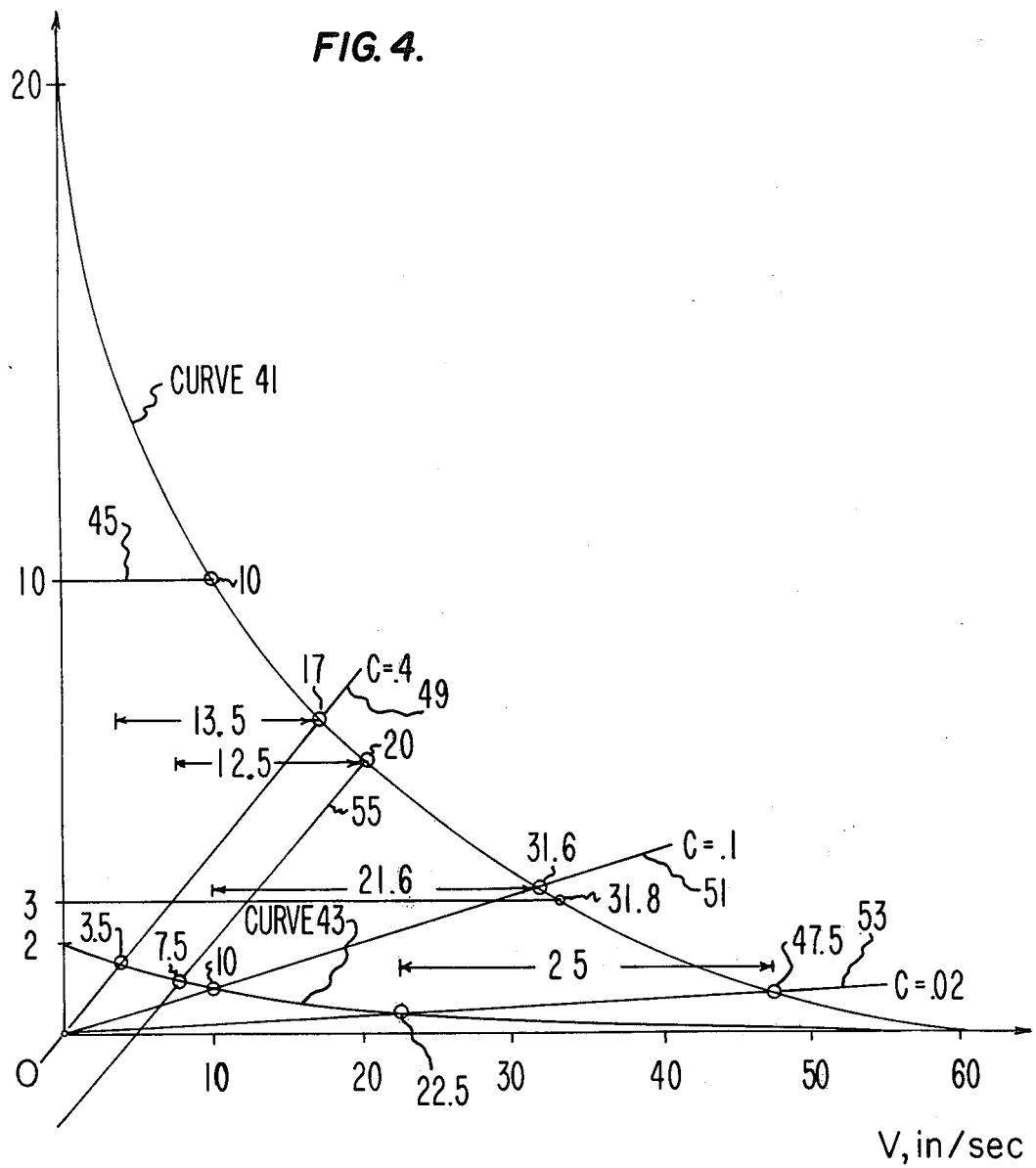

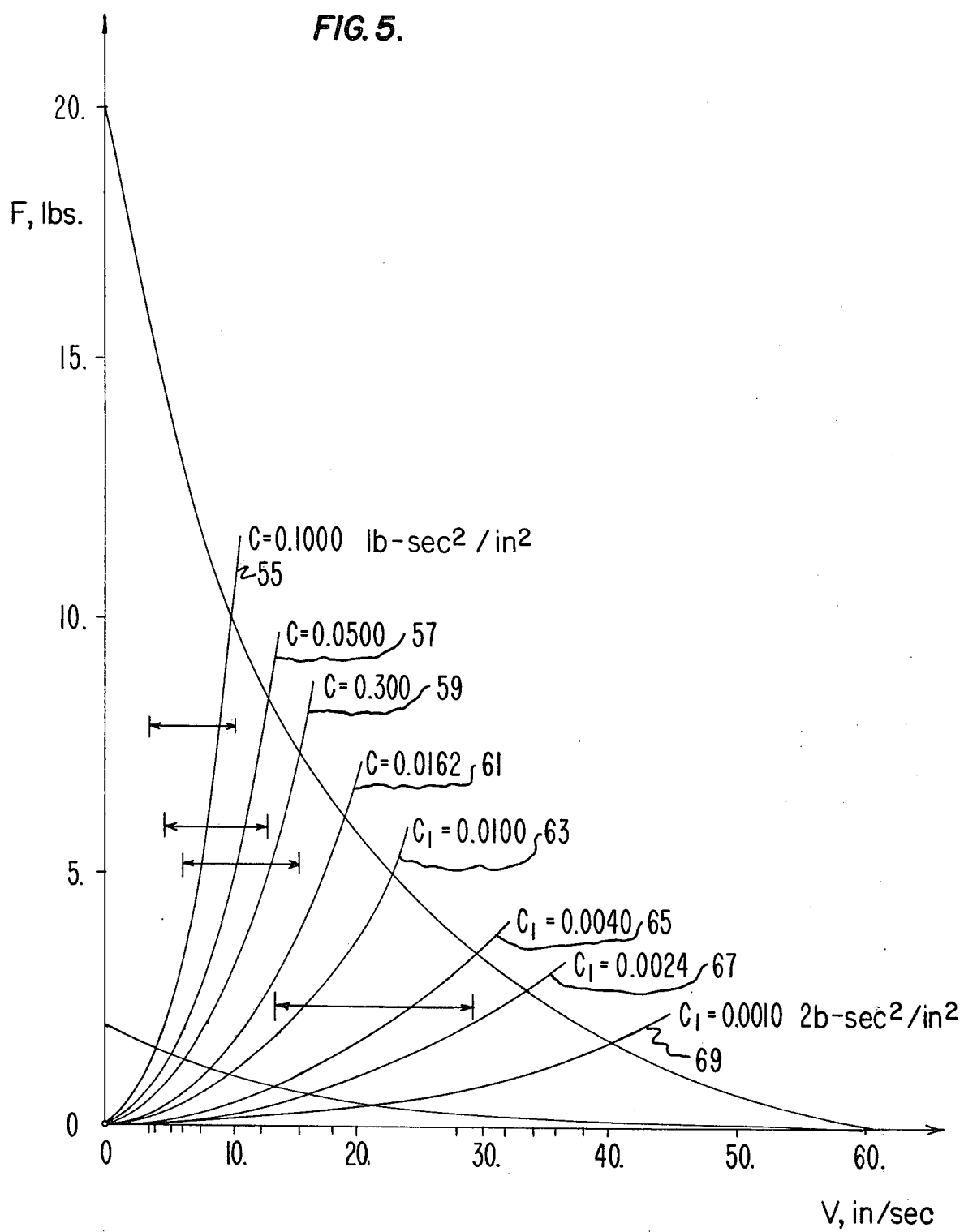

VELOCITY CONTROLLED MANUAL MOVEMENT CREDIT CARD READER

BACKGROUND OF THE INVENTION

1. Field of the Invention

The invention relates to an apparatus for reading or writing information from or onto an information bearing credit card, and more particularly the invention relates to such an apparatus that is manually operable.

2. Description of the Prior Art

In credit card reading devices which read or write information from or to an information bearing credit card, it has been found necessary to control the relative velocity between the credit card and the reading head. As the prior art has developed, sophisticated reading codes have been realized which result in complex reading schemes commanding a definite speed between the card and read head.

However, in order to save energy and reduce costs, more emphasis has of late been directed toward hand-operated credit card readers. Originally, hand-operated credit card readers were utilized with simple informational retrieval systems which counted dots or bars, making the relative speed of the card past the read head of little consequence. However utilizing the above-mentioned advance in the art of more sophisticated reading codes necessitates adequate control of the relative reading velocity.

Several hand operable devices have tried to cure this problem. For example, gravitational forces have been utilized to carry a card along an inclined plane for a predetermined distance, thus establishing a substantially predetermined card speed at a designated point along the card's path. Similarly, spring means have utilized for contractingly pulling a card past a fixed read head, thus generating a predetermined card speed at the read location where the coefficient of the spring and the distance of spring expansion remains fixed.

But often in certain applications it is necessary that the operator retain his hand on the card or carriage during movement thereof. This is necessary where the credit card reader works in association with print imparting means and the operator must apply a transverse force with respect to the movement of the carriage to insure proper printing of embossed credit card information on a receipt ticket. Also, in fingerprint reading devices the operator is required to leave his thumb or palm in a specified location on the carriage during movement thereof.

SUMMARY OF THE INVENTION

Therefore, it is an object of the present invention to provide a hand-operated credit card reader which maintains adequate control of the relative velocity between an informational read/write head and an information bearing credit card.

It is another object of the present invention to provide a hand-operated credit card reader for maintaining a proper relative read/write velocity while permitting the operator to retain his hand onto the credit card, or credit card receiving carriage, during movement thereof.

It is a further object to provide a hand-operated credit card reader having a minimum number of parts and weight.

The foregoing objects are achieved according to the instant invention by a credit card reader utilizing a a slidable carriage for carrying an information bearing credit card into effectual reading registry with respect to an information read head. A spring and dashpot cooperate with the carriage during manual movement thereof for constraining the velocity of the carriage to a prescribed range of velocities dictated by the specifications of the particular read/write head used in coordination with the complexities of the informational code. The credit card is inserted into the carriage and the operator pushes the carriage along its slidable path, continuously applying a force to the carriage with his or her hand.

Other objects, features and advantages will be readily apparent from the following detailed description when considered with the accompanying drawings which show by way of example, and not limitation, the principle of the invention and preferred modes for applying that principle.

BRIEF DESCRIPTION OF THE DRAWINGS

FIG. 4 is a graphical representation of the relationship between a spring and a dashpot functioning in cooperation and of a physiological relationship of a human operator moving a credit card carriage.

FIG. 5 is a graphical representation similar to FIG. 4, but with the dashpot functioning in a nonlinear relationship.

DETAILED DESCRIPTION OF THE PREFERRED EMBODIMENT

Figure 1:
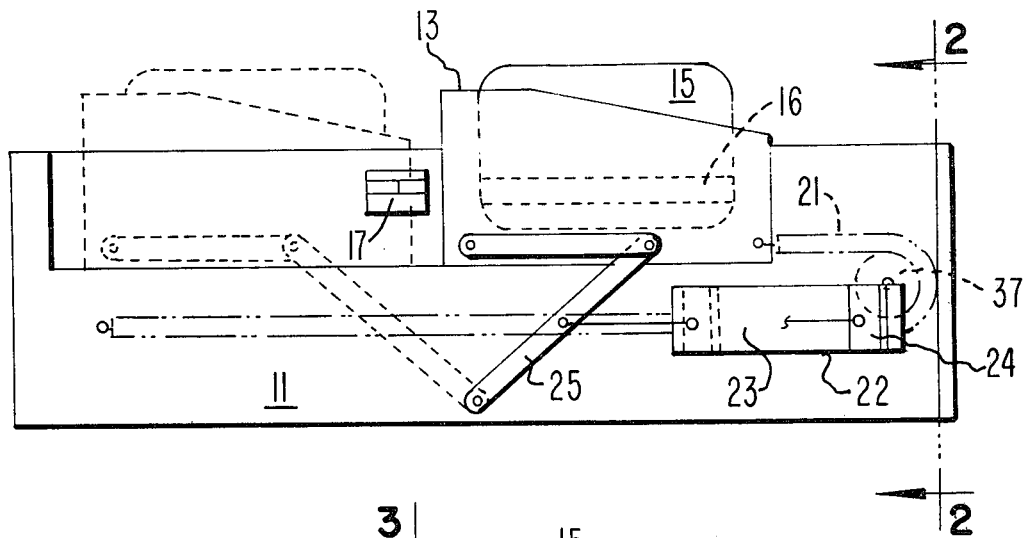
FIG. 1 is a simplified view of the credit card reader of the present invention.
Figure 2:
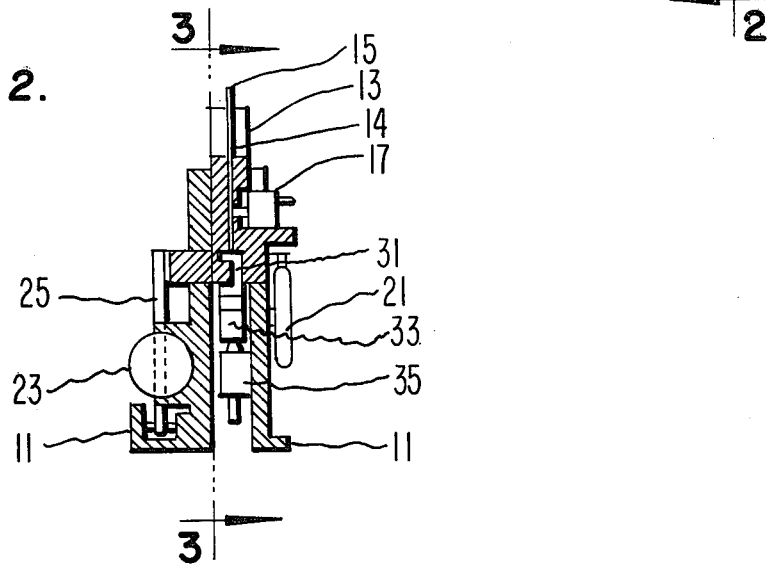
FIG. 2 is an end view of the credit card reader of FIG. 1 and more clearly showing the base structure.

FIG. 1 illustrates an informational read/write head 17 and a credit card holder or carriage 13 mounted in opposed relation on a base member 11. The card holder 13 is slidably mounted to the base and adapted to receive a credit card 15 for carrying the same along a path of travel past the read/write head 17. As seen in FIG. 2, the card-holder has a vertical slot or pocket 14 for containing the card in a rigid upright position.

The card 15 is rectangular in shape having an informational stripe 16 set across one face thereof, parallel to the longer sides of the card. The card is inserted into the holder so that the stripe is parallel with respect to the path of card travel and faced for traversing the read/write head as the card is carried therepast.

Figure 3:
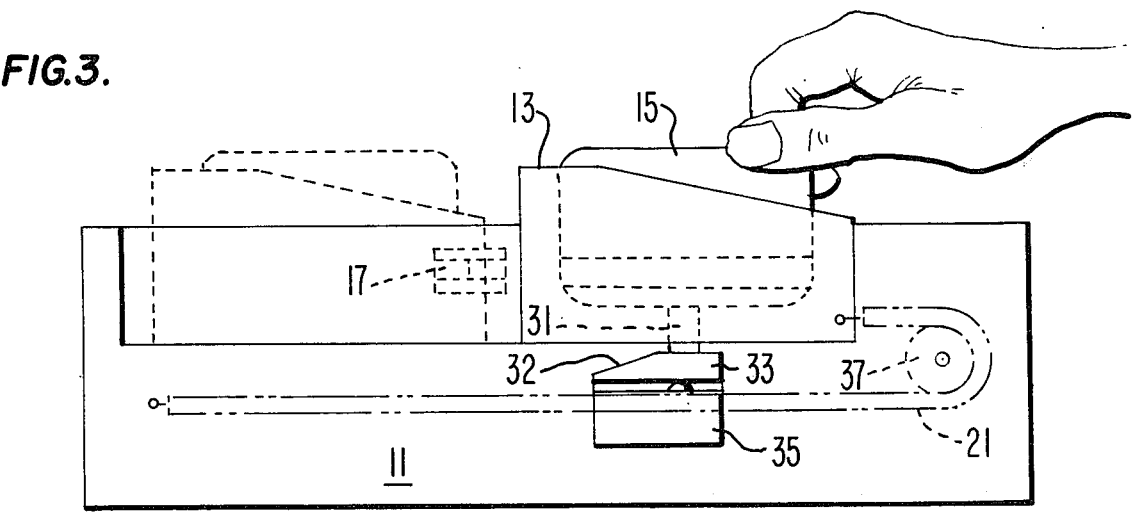
FIG. 3 is a simplified cross section view of a portion of the credit card reader taken along line 3—3 of FIG. 2, showing the read head enabling switch.

The holder 13 is moved along its path of travel by manual movement performed by an operator gripping and pushing the carriage, or by gripping and pushing the card 15 as illustrated in FIG. 3. The carriage 13, base member 11, and read/write head 17 are so disposed as to permit the stripe 16 to traverse the read/write head 17 in close proximity for proper credit card reading.

A spring 21 and dashpot 23 are operatively coupled to the carriage 13 for impeding the movement thereof to restrain the carriage velocity within a chosen range, as will be described below. The spring 21 is arranged in a loop around a pulley 37 and secured to the carriage 13 to permit a long contracting and expanding movement along the line of carriage travel. This "doubled over" arrangement of the spring provides sensitivity to the spring, making its pull on the carriage more constant with less variation in tension. Besides cooperating with the dashpot 23 to restrain the carriage velocity, the spring operates to return the carriage to its initial home position after manual pushing of the carriage or card is completed.

The dashpot 23 is positioned below the carriage for operation along the line of carriage movement and includes a dashpot piston 24 cooperating with a dashpot cylinder 22. The dashpot cylinder 22 is secured to the base member 11 and may be hingedly mounted at one end for free vertical movement of the opposite end of the cylinder as the piston 24 is driven within the cylinder. The piston 24 is driven by a linkage arm 25 which depends from the carriage, coupling the dashpot action with the carriage movement. Although the path of the linkage movement, shown in phantom lines in FIG. 1, follows a slightly arcuate path, the dashpot applies a force substantially along the line of carriage travel, particularly where the dashpot cylinder is hinged at one end for vertical movement of the opposite end.

The relative position of the spring and dashpot with respect to the carriage and its path of travel permits a braking or restraining force to be applied to the carriage substantially opposite to the direction of carriage movement. The spring operates to apply a substantially constant force restraining the carriage movement according to equation $F = k$, where $F$ and $k$ are measured as force in pounds. The dashpot, however, operates with a variable force dependent upon the speed of the carriage and may function either linearly or nonlinearly. The force applied by the dashpot is described by the equation $F = C_1 v$ for linear operation, or $F = C_2 v^2$ for nonlinear operation, where F equals force in pounds, $v$ equals velocity in inches per second, and $C_1$, $C_2$ are defined as the coefficients of dashpot expansion, measured in pounds-seconds per inch and pounds-seconds squared per inches squared, respectively.

The extent of the retarding force applied to the carriage is therefore dependent upon the magnitude of the force constant of the spring and magnitude of the coefficient of dashpot expansion. Thus, the velocity of the carriage is limited within a set range of velocities by prescribing the values given to $k$ and $C_1$ (or $C_2$).

The values given to the spring constant and dashpot coefficient are dependent to a large extent upon the amount and variation of force applied by the operator upon the carriage. Bioengineering and human factor considerations are therefore necessary variables in formulating these values.

To observe the relationship between the spring and dashpot functioning in cooperation with the movement of the carriage by a human operator, a physiological relationship known as Hill's equation is helpful. This classical physiological result relates to the rate of contraction of muscle when a fixed, artifically imposed, level of nueral activation is applied thereto. A load or force (F) on the muscle which opposes its contraction is varied and the velocity or rate of contraction (v) is measured. Hill's equation is recited as follows:

$$v = V_o \frac{S}{P_o} \left( \frac{P_o - F}{S + F} \right)$$

where:
Vo = velocity when F = o
Po = force when $v$ = o

S/Po; determines the "sag" of the curve of Hill's (see FIG. 4) and is empirically determined to usually be ¼.

As illustrated in FIG. 4, two curves 41, 43 are plotted according to Hill's equation and are chosen as representatives of an upper and lower limit of an operator's range of nueral activities. Curve 41 has Vo=60 inches per sec. and Po=20 lbs.; curve 43 has Vo=60 inches per sec. and Po = 2 lbs. These limits suggest that between 2 and 20 pounds of force are used to move the carriage, and the speed of the carriage will not exceed 60 inches per second when no force impedes the carriage movement. Both limits of activity are extreme and practically all operator's activity will fall within the bounding curves.

Between the two curves 41, 43 lie a family of curves with each curve representing a different level of nueral activation. The curves serve to illustrate that as the force restraining the carriage movements decreases (traveling down the ordinate) the range of permissible velocities imparted to the carriage increases in a nonlinear fashion.

To understand the relationship of the spring cooperating with the carriage, take for example a spring force of 10 lbs. and a spring force of 3 lbs, which are illustrated respectively in FIG. 4 by line 45 and line 47. Since all reasonable activity is said to occur between the bounding curves 41, 43 the approximate velocity range corresponding to the carriage movement with a spring restraining force of 10 lbs. is 0–10 inches per sec. and with a spring restraining force of 3 lbs. the velocity range is 0–31.8 inches per sec. These values can be computed graphically or by the solution of the boundary equations' instersections with the two spring equations. The observation of the spring's relationship with Hill's equation serves to illustrate that a spring alone provides only a small control over the velocity of the carriage and is almost entirely dependent upon the location of curve 41, i.e., almost entirely dependent upon the operator's maximum level of nueral activation during manual movement. While the spring does act to limit the velocity of the carriage and may be adequate for certain informational reading codes, the spring may not be satisfactory where a more contained range of velocities is desired.

However, a dashpot which applies a force to the carriage according to the magnitude of carriage velocity, limit the range of velocities more narrowly than that realized by the spring. The relationship of a linear dashpot cooperating with the carriage may be similarly observed in FIG. 4 from the curves 49, 51, 53 representing three linear dashpots having respective coefficients of 0.4, 0.1, 0.02 lb.-sec. per inch. The three curves are drawn according to the equation $F = Cv$, yielding straight lines having an ordinate-intercept of 0 at the origin and a slope equal to its respective coefficient of dashpot expansion. The bounding curves set the range of velocities and thus a linear dashpot having C = 0.4 corresponds to a carriage velocity range of 3.5–17.0 inches per sec.; a dashpot having C=0.1 corresponds to a range of 10–31.6 inches per sec.; and a dashpot with C=0.02 corresponds to a range of carriage velocities of 22.5–47.5 inches per sec. These values can be computed graphically or by the solution of their respective equation intersected with the two bounding Hill's equations. The observation of the dashpot's relationship with Hill's equation serves to illustrate that as the coefficient of dashpot expansion decreases, the corresponding range of permissible velocities becomes less contained and the range begins at higher starting velocities.

Similarly, the relationship of a non-linear dashpot cooperating with a carriage may be observed in FIG. 5 by the curves 55, 57, 59, 61, 63, 65, 67, 69, each representing a non-linear dashpot having respective coefficients of 0.1, 0.05, 0.03, 0.0162, 0.01, 0.004, 0.0029, 0.001 lb.-sec.$^2$ per inches $^2$. The curves are parabolic, tracing upward from the origin about the oridinate axis. From FIG. 5 the non-linear dashpot's relationship with Hill's equation serves to illustrate that as the coefficient of dashpot expansion decreases, the corresponding range of permissible velocities becomes less contained and the range begins at higher starting velocities. Although similar to the linear dashpot, the non-linear dashpot has a more contained corresponding velocity range due to its parabolic character.

To make the presecription of the correct restraining means required to establish a desired range of velocities, which may be dictated for example by the type of reading code utilized and/or informational bit density on the credit card stripe, a spring and a dashpot are utilized conjointly making such prescription easily and quickly determinable. The effect of using both a spring force and a dashpot force may be observed by the two lines 49 and 55 in FIG. 4. Line 49, as previously mentioned, represents the functioning characteristics of a linear dashpot into which is added in working combination a spring force of 2 lbs. to yield line 55. As seen by the relationship of line 49 and 55, the addition of a constant spring force has the effect of shifting the dashpot curve along the ordinate to give an ordinate-intercept value dependent upon K, the spring constant. The effect of changing the ordinate intercept is to slide the range of velocity to the right along the abscissa. Although the nonlinearity of the bounding curve tends to shrink the range during shifting along the abscissa, one many choose to a reasonable approximation the value of C, dashpot coefficient, to substantially set the range of the velocities, and choose $k$, spring constant, to substantially set the minimum and maximum values between which the range lies; after which a fine tuning of the constant and coefficient may set the device to the accuracy demanded by the operator.

The foregoing analysis relating to Hill's equation demonstrates that a spring and dashpot cooperating together may be varied as to the amount of force applied to reasonably control the velocity of the carriage within a decided maximum and minimum range of values. Of course, abnormal bounds were chosen to cover practically all operators activities, but the average operator, especially after using the device, will not tend to have much speed variation, and therefore shrink the range about a certain speed value.

An electrical switch 35 shown in FIG. 3 is utilized to enable the read head as the carriage is manually pushed from its home position. A switch cam, held contiguous to the top portion of switch 35 by switch arm 31, is biased for movement a short distance away from the switch 35 to perform the switching operation. The switch arm 31 is secured to the underside of the carriage for holding the switch cam against the bias onto the switch 35 while the carriage is in its home position, keeping the switch in its off position. During carriage movement switch arm 31 is carried away from the switch cam 35 permitting the cam to biasingly move away from the switch 35 turning the same on. To turn the switch off as the return spring brings the carriage back to its home position, the switch cam 33 is provided with a ramped edge 32 for meeting the switch arm in a sliding engagement pushing the switch cam back onto the switch 35 as the arm 31 travels along the ramp 32.

It should be understood, of course, that the foregoing disclosure relates to a preferred embodiment of the invention and that modifications or alterations may be made therein without departing from the spirit or scope of the invention as set forth in the appended claims.

What is claimed is:

1. A manually-operable credit card reader for reading information from an information bearing credit card comprising:
   a base member;
   carriage means adapted to carry an information bearing credit card, and slidably mounted on said base member for manual movement along a linear path;
   an information read head mounted on said base member in alignment with the path of movement of the credit card and operable during said manual movement of said carriage means, for effectuating proper sensing of the information borne by the card; and
   restraining means cooperating with said carriage means during said manual movement thereof for limiting the velocity of said carriage means to a prescribed range of velocities as said carriage means is moved past said informational read head, said restraining means comprising:
   a. first means for applying a substantially constant force opposed to the direction of movement of said carriage means; and
   b. second means operating in parallel with said first means for applying a force responsive to the magnitude of velocity of said carriage means.

2. A device according to claim 1 wherein said first means includes spring means.

3. A device according to claim 1 wherein said second means includes dashpot means.

4. A device according to claim 3 wherein said dashpot means applying a force non-linearly dependent upon said magnitude of velocity of said carriage means.

5. A device according to claim 1 wherein the amount of constant force applied by said first means and the amount of force applied by said second means are established by the operating characteristics of said first means and said second means according to the equation:

$$v = V_o \left( \frac{S}{P_o} \right) \left( \frac{P_o - F}{S + F} \right),$$

$v$ representing the velocity of said carriage means, F representing the force applied by said restraining means, Vo representing the velocity of said carriage means when F = O, Po representing the force applied by said restraining means for $v$ = O, and (S/Po) equalling to ¼.

* * * * *